US008185907B2

(12) United States Patent
Gusler et al.

(10) Patent No.: US 8,185,907 B2
(45) Date of Patent: May 22, 2012

(54) METHOD AND SYSTEM FOR ASSIGNING LOGICAL PARTITIONS TO MULTIPLE SHARED PROCESSOR POOLS

(75) Inventors: Carl Phillip Gusler, Austin, TX (US); Rick Allen Hamilton, II, Charlottesville, VA (US); William Louis Moraca, Jr., McLean, VA (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 1307 days.

(21) Appl. No.: 11/841,111

(22) Filed: Aug. 20, 2007

(65) Prior Publication Data

US 2009/0055830 A1   Feb. 26, 2009

(51) Int. Cl.
*G06F 9/455*  (2006.01)
*G06F 9/46*   (2006.01)

(52) U.S. Cl. ............ 718/104; 718/1; 718/100; 718/102; 718/103

(58) Field of Classification Search .................. None
See application file for complete search history.

(56) References Cited

U.S. PATENT DOCUMENTS

| | | | | |
|---|---|---|---|---|
| 6,763,441 B2 * | 7/2004 | Bobak | ........................... | 711/162 |
| 6,957,435 B2 | 10/2005 | Armstrong et al. | | |
| 7,096,469 B1 * | 8/2006 | Kubala et al. | ................ | 718/100 |
| 7,707,578 B1 * | 4/2010 | Zedlewski et al. | ............ | 718/102 |
| 2001/0056456 A1 * | 12/2001 | Cota-Robles | .................. | 709/103 |
| 2002/0156824 A1 * | 10/2002 | Armstrong et al. | ........... | 709/104 |
| 2003/0084030 A1 * | 5/2003 | Day et al. | ........................... | 707/3 |
| 2003/0084372 A1 * | 5/2003 | Mock et al. | ..................... | 714/15 |
| 2006/0007944 A1 | 1/2006 | Movassaghi et al. | | |
| 2006/0136761 A1 * | 6/2006 | Frasier et al. | ................. | 713/320 |
| 2007/0150894 A1 * | 6/2007 | Barsness et al. | .............. | 718/100 |

FOREIGN PATENT DOCUMENTS

JP   10-105419   4/1998

OTHER PUBLICATIONS

Gregor Bencina; IBM System p5; Widening the Gap!; 36 pages.
Blank et al.; Advanced Power Virtualization on IBM System p5; pp. 50-67; ibm.com/redbooks.

* cited by examiner

*Primary Examiner* — Emerson Puente
*Assistant Examiner* — Jonathan R Labud
(74) *Attorney, Agent, or Firm* — Schmeiser, Olsen & Watts; William E. Schiesser

(57) ABSTRACT

A method and system for assigning logical partitions to multiple named processor pools. Sets of physical processors are assigned to predefined processor sets. Named processor pools with unique pool names are defined. The processor sets are assigned to the named processor pools so that each processor set is assigned to a unique named processor pool. A first set of logical partitions is assigned to a first named processor pool and a second set of logical partitions is assigned to a second named processor pool. A first processor set is assigned to the first named processor pool and a first set of physical processors is assigned to the first processor set. Similarly, a second processor set is assigned to the second named processor pool and a second set of physical processors is assigned to the second processor set.

20 Claims, 10 Drawing Sheets

METHOD AND SYSTEM FOR ASSIGNING LOGICAL PARTITIONS TO MULTIPLE SHARED PROCESSOR POOLS

FIELD OF THE INVENTION

The present invention relates to a method and system for assigning logical partitions to multiple shared processor pools.

BACKGROUND OF THE INVENTION

CPUs (a.k.a. processors or physical processors) default to an assignment in a shared pool if the CPUs are not assigned to a dedicated logical partition workload and are not designated as capacity upgrade processors (i.e., processors that provide capacity on demand). Given that the current art allows for only a single shared pool of CPUs per computer system, conventional logical partitioning provides for only a single shared pool from which to pull CPU micropartitions. In other words, all micropartitions in a single CPU can belong to only one pool. Micropartitioning allows CPUs to be shared via time slicing among multiple operating system instances. This single shared pool constraint limits the configuration options for logical partition allocation so that a system administrator cannot allocate logical partitions based on functionality to keep, for example, test logical partitions from taking processor resources that are best allocated to production. Further, the single shared pool restriction drives up the total cost of ownership (TCO) for software products licensed on a per-CPU basis. For instance, a software product's license is purchased for every CPU in the single shared pool even if the sum of the micropartition allocations for the software is less than the total number of CPUs in the pool. Still further, conflicts arise among multiple organizational departments over the processing resources shared among the departments via the single shared pool. Thus, there exists a need to overcome at least one of the preceding deficiencies and limitations of the related art.

SUMMARY OF THE INVENTION

The present invention provides a computer-based method of assigning logical partitions of a computing system to multiple named processor pools, the method comprising:

assigning, by the computing system, a plurality of sets of one or more physical processors from a plurality of available physical processors in the computing system to a plurality of predefined processor sets so that the sets of one or more physical processors are associated with the processor sets in a one-to-one correspondence;

defining, by the computing system, a plurality of named processor pools, each named processor pool being associated with a unique pool name;

assigning, by the computing system, the plurality of processor sets to the plurality of named processor pools so that each processor set is assigned to a unique named processor pool of the plurality of named processor pools;

assigning, by the computing system, a first set of logical partitions to a first named processor pool of the plurality of named processor pools, wherein a first processor set of the plurality of processor sets is assigned to the first named processor pool via the assigning the plurality of processor sets, and wherein a first set of one or more physical processors is assigned to the first processor set via the assigning the plurality of sets of one or more physical processors; and assigning, by the computing system, a second set of logical partitions to a second named processor pool of the plurality of named processor pools, wherein a second processor set of the plurality of processor sets is assigned to the second named processor pool via the assigning the plurality of processor sets, and wherein a second set of one or more physical processors is assigned to the second processor set via the assigning the plurality of sets of one or more physical processors.

A computing system, computer program product, and process for supporting computing infrastructure corresponding to the above-summarized method are also described and claimed herein.

Advantageously, the present invention provides a technique for assigning processors of a single computing system into multiple shared pools, thereby reducing TCO, enhancing system flexibility in terms of increasing configuration options for logical partitions, and permitting finer granularity in the accounting of processing resources among competing organizational departments. Regarding the reduction of the TCO, many independent software vendor software products are licensed on a per-CPU basis and standard practice is that a software license must be purchased for every CPU in the prior art single shared pool, even if the sum of the micropartition allocations is less than all of the CPUs in the pool. In contrast, one of the present invention's named shared pools can be advantageously used for all the micropartitions associated with a particular licensed software product to confine the number of licenses to the smallest number of CPUs (i.e., decreasing the cost of licensing the software product). Regarding the enhanced system flexibility, system administrators can allocate logical partitions based on functionality. For example, the present invention allows all test logical partitions to be allocated to a single named pool and separated from similar pools for development or production. This separation keeps logical partitions from taking processing resources that are best and nominally allocated to production. Regarding the finer granularity of the accounting of processing resources, an organization's department is associated with its own pool of processing resources and that department shares micropartitions in its pool only with applications belonging to that department. That is, processing resources of the department's pool are not shared with any other competing departments.

DETAILED DESCRIPTION OF THE INVENTION

Figure 1A:
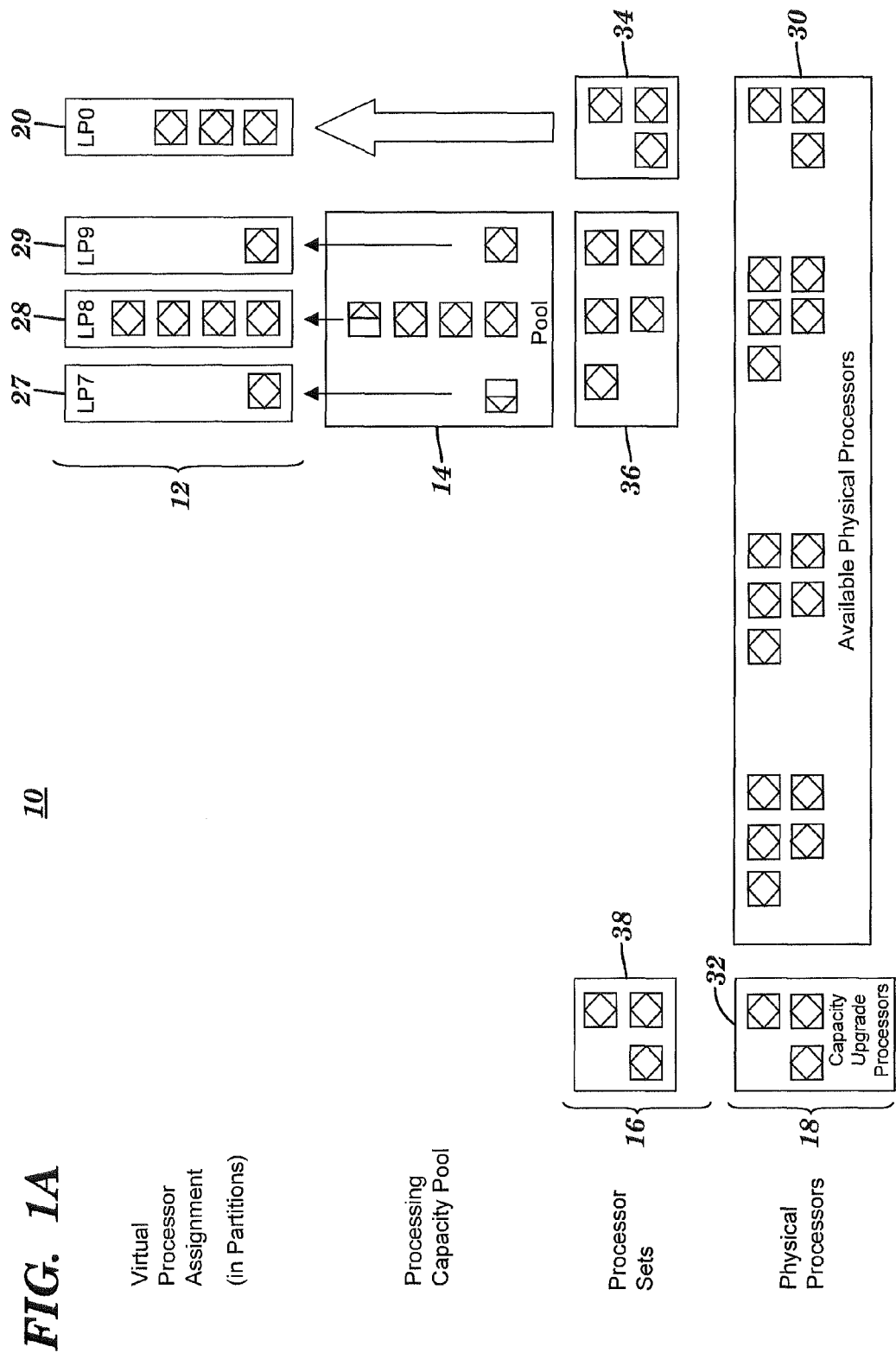
FIG. 1A is a prior art example of logical partition assignment using a single shared processor pool.

The present invention divides processing resources of a computing system with logical partitioning capabilities into multiple shared pools of processing capacity. The multiple shared pools described herein are an enhancement of the single shared pool in systems such as the i5 and p5 servers offered by International Business Machines Corporation of Armonk, N.Y. The novel sharing of processing resources using multiple named shared pools described herein allows multiple sets of physical processors so that micropartitions can be grouped together in separate named pools where each of the separate pools is associated with a separate group of one or more logical partitions. Further, the present invention allows micropartitions of a single physical processor (i.e., CPU) to be in separate pools. Such multiple named shared pools allow administrators allocating micropartitions to group logical partitions according to the following rules:

1. Run a particular application (e.g., DB2®) using the processing resources in a shared pool of the multiple shared processor pools, where the shared pool is isolated from logical partitions running other applications (e.g., Oracle®).

2. Run only applications of one family or only complementary applications in a shared pool of the multiple shared processor pools (e.g., the shared pool is associated with a family of Oracle® and DB2® database applications or with entity X's complementary applications consisting of an application web server, application server and database server).

3. Organize partitions according to broadly-based functions, such as test, development, or production.

4. Organize applications according to end user business customers (e.g., a group of all human resources applications or a group of all accounts receivable applications).

As used herein, a logical partition (a.k.a. partition) is defined as a virtualization of a computer's resources (i.e., processors, memory and adapter cards) into an independent processing environment. As used herein, a micropartition is defined as a virtualization of a computer's resources into an independent processing environment that utilizes time slicing among multiple operating system instances so that environment appears to have a fractional part of an indivisible resource (e.g., a CPU chip), or appears to share more resources than the system actually contains. That is, micropartitioning allows a fraction of processing time of a processor associated with a processor pool to be assigned to a logical partition. For example, on a system with four CPUs being shared via a processor pool, time slicing can allow 40 logical partitions each with an allocation of 1/10 of a CPU's processing time. The placing of the CPUs in a pool also implies a pool of logical partitions that share the pool.

As used herein, a processing resource (a.k.a. processor resource) is a processor (i.e., CPU) or a fractional (i.e., non-whole number) part of a processor, where the fractional part is a time slice of the processor's processing time. The time slice is expressed, for instance, as x CPU cycles per a given number of CPU cycles or as an amount of processing time per a given duration of time.

Single Shared Processor Pool Configuration

FIG. 1A is a prior art example of logical partition assignment using a single shared processor pool. A computing system 10 includes virtual processor assignments in partitions 12, a single processing capacity pool 14, processor sets 16 and physical processors 18. Partitions 12 include logical partitions 20, 27, 28 and 29 (i.e., LP0, LP7, LP8 and LP9, respectively). Physical processors 18 include available physical processors 30 and capacity upgrade processors 32. As used herein, a processor set is defined as a designated grouping of specific physical processors, which is not a virtual processing capacity construct. Processor sets 16 include a dedicated processor set 34 and a processor set 36.

Dedicated processor set 34 is dedicated to LP0. That is, LP0 has access to all processing resources included in dedicated processor set 34, does not share the processing resources in set 34 with any other logical partition, and no other logical partition shares its processing resources with LP0.

Processor set 36 includes five specific processors of the available physical processors 30. Processor set 36 is a single set of processors assigned to pool 14, which includes specific capacity allocations for partitions LP7, LP8 and LP9. It should be noted that the conventional configuration of FIG. 1A is limited to only one pool being used for the allocation of processors in a designated processor set 36. In the three columns of symbols (i.e., square with a diamond inside the square) and/or half symbols (i.e., half diamond within a square) in pool 14, the half symbol in the left column indicates that LP7 is allocated 10% of the processing resources (e.g., CPU cycles) of the 5 processors in processor set 36. That is, the half symbol represents 0.5 of a full unit of processing resources, there are a total of 5 full units of processing resources represented in pool 14 (i.e., 4 full symbols plus 2 half symbols=5 full symbols or 5 units of processing resources), and 0.5/5=10%. Using analogous calculations, pool 14's middle column of 3.5 symbols indicates that LP8 is allocated 70% of the processing resources of processor set 36 (i.e., 3.5/5=70%). Similarly, the right column in pool 14 which includes 1 symbol indicates that LP9 is allocated 20% of the processing resources of processor set 36 (i.e., 1/5=20%).

Capacity upgrade processors 32 are in a separate processor set 38 that includes only capacity upgrade processors (i.e., no regularly available processors are included in the set of capacity upgrade processors). As used herein, a capacity upgrade processor is defined as a physical processor installed in a multi-processor system but not generally available for use. Capacity upgrade processors allow the multi-processor system to be upgraded without requiring a hardware technician to physically open a case and physically install chips into sockets. Instead, the capacity upgrade processors remain offline and unavailable until a system administrator provides a special firmware license key, which activates one or more of the capacity upgrade processors, thereby moving them from the set of capacity upgrade processors to the set of available physical processors. Typically, the receipt of the firmware key from the manufacturer involves a sales transaction.

System for Assigning Logical Partitions to Multiple Shared Processor Pools

Figure 1B:
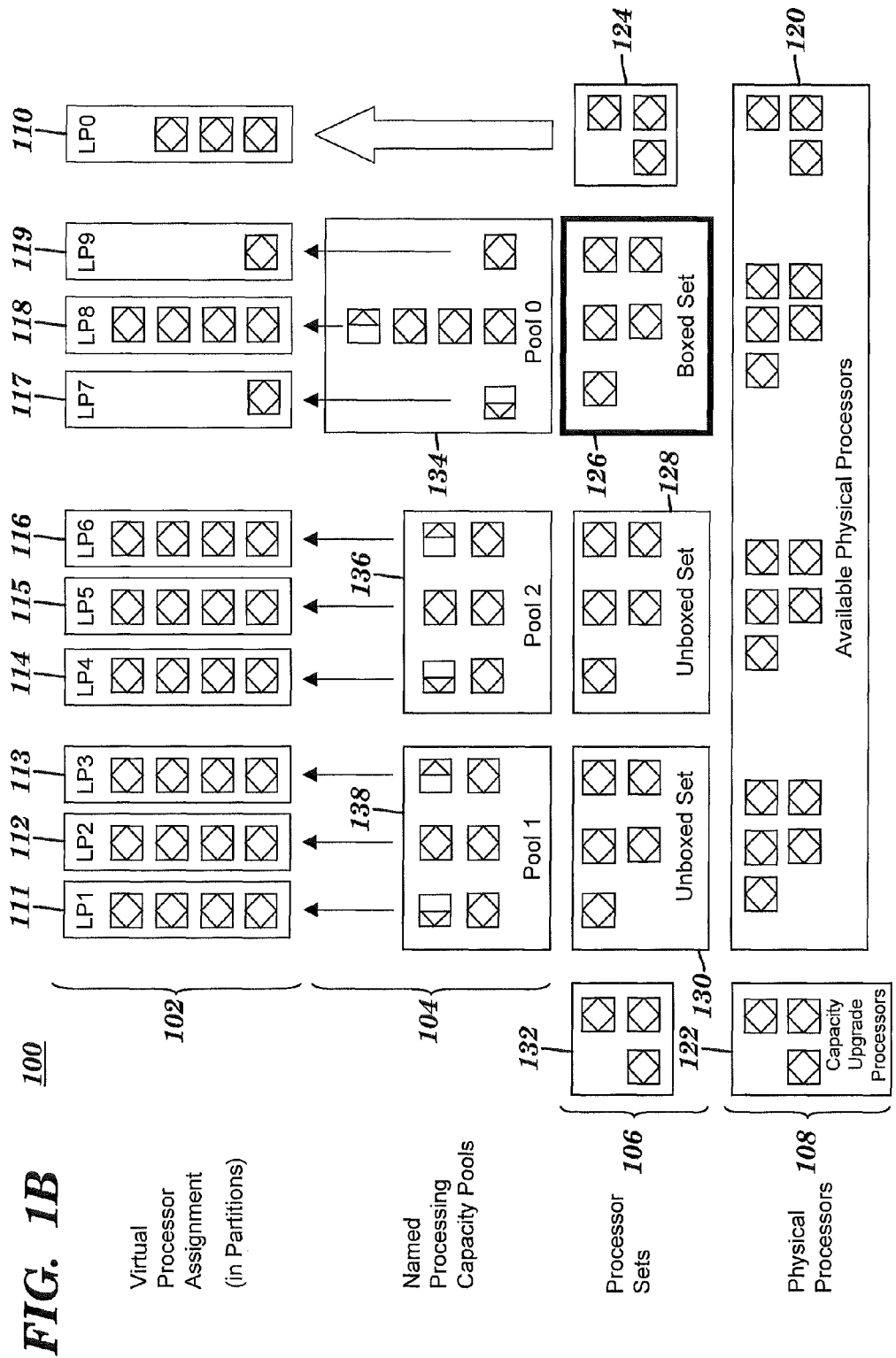
FIG. 1B is an example of a system for assigning logical partitions to multiple shared processor pools, in accordance with embodiments of the present invention.

FIG. 1B is an example of a system for assigning logical partitions to multiple shared processor pools, in accordance with embodiments of the present invention. A computing system 100 includes virtual processor assignments in partitions 102, named processing capacity pools 104, processor sets 106 and physical processors 108. Partitions 102 include logical partitions 110-119 (i.e., LP0-LP9, respectively). Physical processors 108 include available physical processors 120 and capacity upgrade processors 122.

Processor sets 106 include a dedicated processor set 124, a boxed processor set 126 and unboxed processor sets 128, 130. As used herein, a boxed processor set (a.k.a. boxed set) is defined as a set of physical processors that does not share its processors with a pool to which any other processor set is assigned. As used herein, an unboxed processor set (a.k.a. unboxed set) is a set of physical processors that are capable of being shared with one or more pools to which one or more processor sets are assigned. The sharing of processors in an unboxed set is discussed below relative to FIG. 1E.

Dedicated processor set 124 is dedicated to LP0. That is, LP0 has access to all processing resources included in dedicated processor set 124, does not share the processing resources in set 124 with any other logical partition, and no other logical partition shares its processing resources with LP0.

Boxed processor set 126 includes five specific processors of the available physical processors 120. Boxed set 126 is assigned to pool 134, which indicates specific capacity allocations for partitions LP7, LP8 and LP9. In the three columns of symbols in pool 134, the half symbol in the left column indicates that LP7 is allocated 10% of the processing resources of the 5 processors in boxed set 126. Further, the 3.5 symbols in the middle column of pool 134 indicates that LP8 is allocated 70% of the processing resources of boxed set 126 and the one symbol in the right column of pool 134 indicates that LP9 is allocated 20% of the processing resources of processor set 126. The calculations of the processor resources allocations to LP7-LP9 are similar to the calculations described above relative to LP7-LP9 of FIG. 1A.

Unboxed set 128 includes five specific processors of the available physical processors 120. Unboxed set 128 is assigned to pool 136, which indicates capacity allocations for logical partitions LP4-LP6. The 1.5 symbols in each of the left and right columns of pool 136 indicate that LP4 and LP6 are each allocated 30% (i.e., 1.5/5=30%) of the processing resources of the 5 processors included in unboxed set 128. Further, the 2 symbols in the middle column of pool 136 indicates that LP 5 is allocated 40% (i.e., 2/5=40%) of the processing resources of unboxed set 128.

Unboxed set 130 includes five specific processors of the available physical processors 120. Unboxed set 130 is assigned to pool 138, which indicates capacity allocations for logical partitions LP1-LP3. Similar to the processor resources allocation calculations described above relative to unboxed set 128 and pool 136, the allocations of the processor resources of unboxed set 130 are 30%, 40% and 30% for LP1, LP2 and LP3, respectively.

Capacity upgrade processors 122 are in a separate capacity upgrade processor set 132 that includes only capacity upgrade processors (i.e., no regularly available processors are included in the set of capacity upgrade processors).

A management system provides the logic that defines and configures the processor sets, named processor pools and logical partitions to allow the sharing of multiple named processing pools, as discussed above relative to FIG. 1B and below relative to FIGS. 1C-1F. In one embodiment, the management system is a hardware management console (HMC) residing in a hypervisor. The hypervisor and HMC are described in more detail below relative to FIG. 4.

Figure 1C:
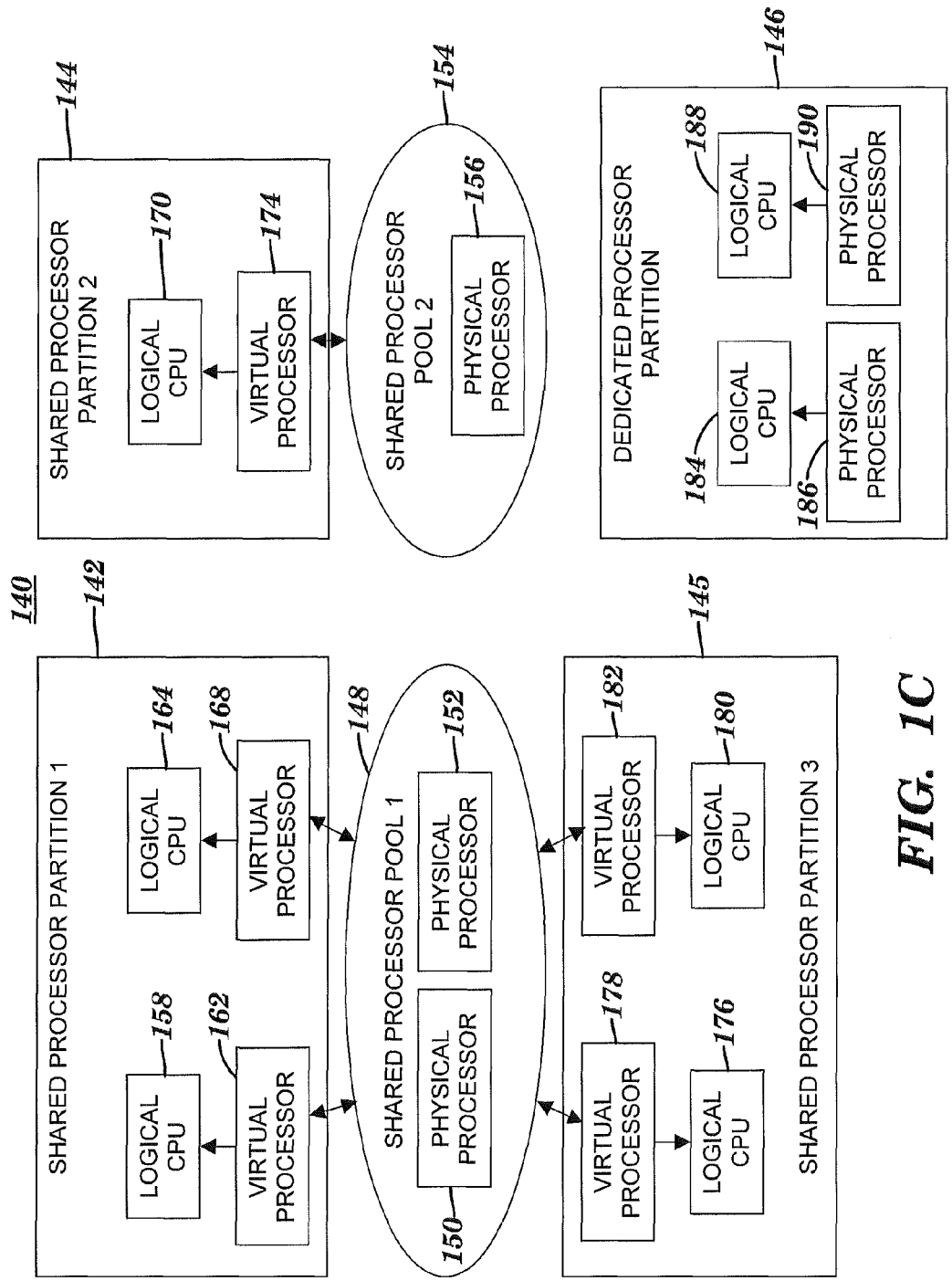
FIG. 1C is a block diagram of a system for assigning logical partitions to multiple shared processor pools where separate sets of logical partitions are sharing resources of a pool of the multiple shared processor pools, in accordance with embodiments of the present invention.

FIG. 1C is a block diagram of a system for assigning logical partitions to multiple shared processor pools where separate sets of logical partitions are sharing resources of a pool of the multiple shared processor pools, in accordance with embodiments of the present invention. System 140 includes shared processor partitions 142, 144 and 145 and a dedicated processor partition 146. System 140 also includes a shared processor pool 148, which includes a plurality of physical processors 150, 152. Further, system 140 includes shared processor pool 154, which includes a physical processor 156.

Shared processor partition 142 includes logical CPUs 158 and 164, and virtual processors 162 and 168 assigned to logical CPUs 158 and 164, respectively. Shared processor partition 144 includes a logical CPU 170 and a virtual processor 174 assigned to logical CPU 170. Shared processor partition 145 includes logical CPUs 176 and 180, and virtual processors 178 and 182 assigned to logical CPUs 176 and 180, respectively. Dedicated processor partition 146 includes logical CPUs 184 and 188 and physical processors 186 and 190 assigned to logical CPUs 184 and 188, respectively.

The processing resources of the physical processors included in shared processor pool 148 are shared among both the logical CPUs of partition 142 and the logical CPUs of partition 145. It should also be noted that in the novel configuration of FIG. 1C, there are a plurality of processor pools (i.e., pools 148 and 154) instead of the single processor pool of FIG. 1A.

Sharing Spare Processing Capacity in Uncapped Partitions

Figure 1D:
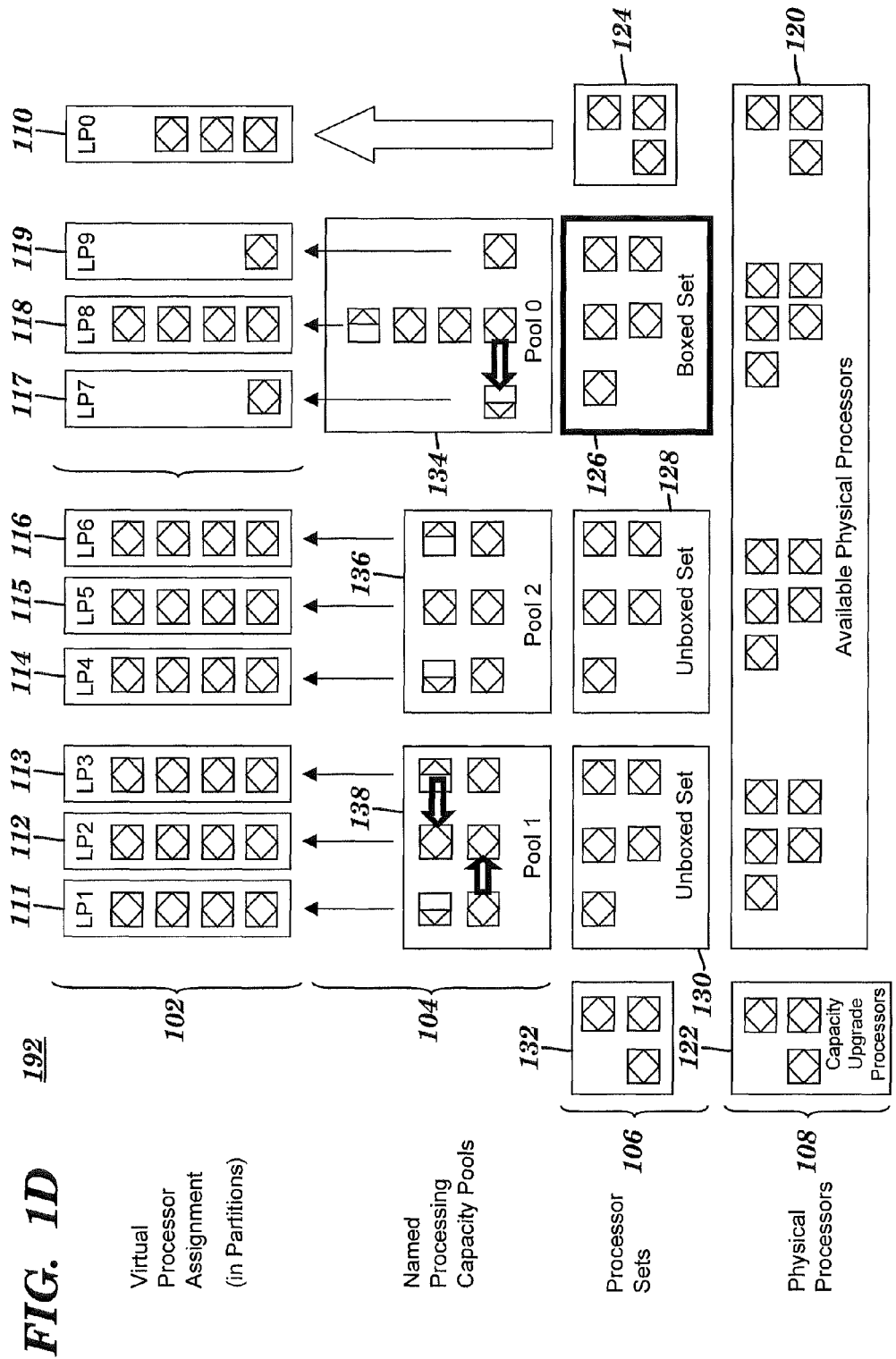
FIG. 1D is an example of the system of FIG. 1B in which spare processing capacity in uncapped partitions is shared, in accordance with embodiments of the present invention.

FIG. 1D is an example 192 of the system of FIG. 1B in which spare processing capacity in uncapped partitions is shared. The exemplary system 192 includes the same configuration of components of FIG. 1B, but specifically defines pool 136 as including processing capacity allocated to capped partitions and specifically defines pools 134 and 138 as including processing capacity allocated to uncapped partitions. As a further difference between exemplary system 192 and the system of FIG. 1B, two arrows are added to pool 138 to indicate the sharing of spare processing capacity (i.e., micropartitions) in the pool belonging to LP1, LP2 and LP3. That is, the processing capacity of pool 138 can be shared among logical partitions LP1, LP2 and LP3 (i.e., the logical partitions assigned to pool 138). For example, upon determining that logical partition LP2 needs more processing resources, logical partitions LP1 and LP3 provide their unused processing resources to LP2. The arrow originating at the processing unit aligned under LP1 indicates the unused processing resources provided to LP2 by LP1. The arrow originating at the half processing unit aligned under LP3 indicates the unused processing resources provided to LP2 by LP3.

Similarly, system 192 adds an arrow in pool 134 to indicate the sharing of spare processing capacity in pool 134 among logical partitions LP7, LP8 and LP9. For example, if logical partition LP7 needs more processing resources and logical partition LP8 has unused processing resources, then LP8 provides unused processing resources to LP7.

Although each arrow added in FIG. 1D indicates prior art sharing in the context of the pool in which the arrow resides, the existence, in a single computing system, of multiple pools in which such sharing occurs is a novel aspect of the present invention. For example, multiple pools 134 and 138 include the capability of sharing processing resources among logical partitions, whereas the prior art configuration of FIG. 1A includes only a single pool (see pool 14 of FIG. 1A).

The aforementioned arrows added to system 192 are shown in pools 134 and 138 because the constraint for capping exists in the level of the pools and because the sharing of processing capacity logically happens in the pools. Although not shown, similar arrows could also be added to other levels of system 192. For example, as the sharing of FIG. 1D appears to happen between partitions, arrows analogous to the two arrows in pool 138 could be shown between LP1 and LP2 and between LP3 and LP2.

As used herein, a capped partition is defined to be a logical partition that cannot use more processing capacity than its allocation (i.e., the specified processing capacity allocable to the logical partition), even if processors are idle due to a lack of available work from other partitions in the same pool. Capping assures that a particular logical partition does not exceed its allocated usage. Moreover, logical partitions associated with dedicated physical processors are essentially "hard capped" by that association, even though the strict definition of capping does not apply to such partitions.

As used herein, an uncapped partition is defined as a logical partition that is capable of utilizing spare processing capacity beyond its allocation. In the prior art, an uncapped partition utilizes spare processing capacity only in its own pool. In the present invention, an uncapped partition is allowed to utilize spare processing capacity in its own pool (i.e., the named processing capacity pool to which the uncapped partition is assigned) and in other pools.

Sharing Spare Processing Capacity in Unboxed Processor Sets

Figure 1E:
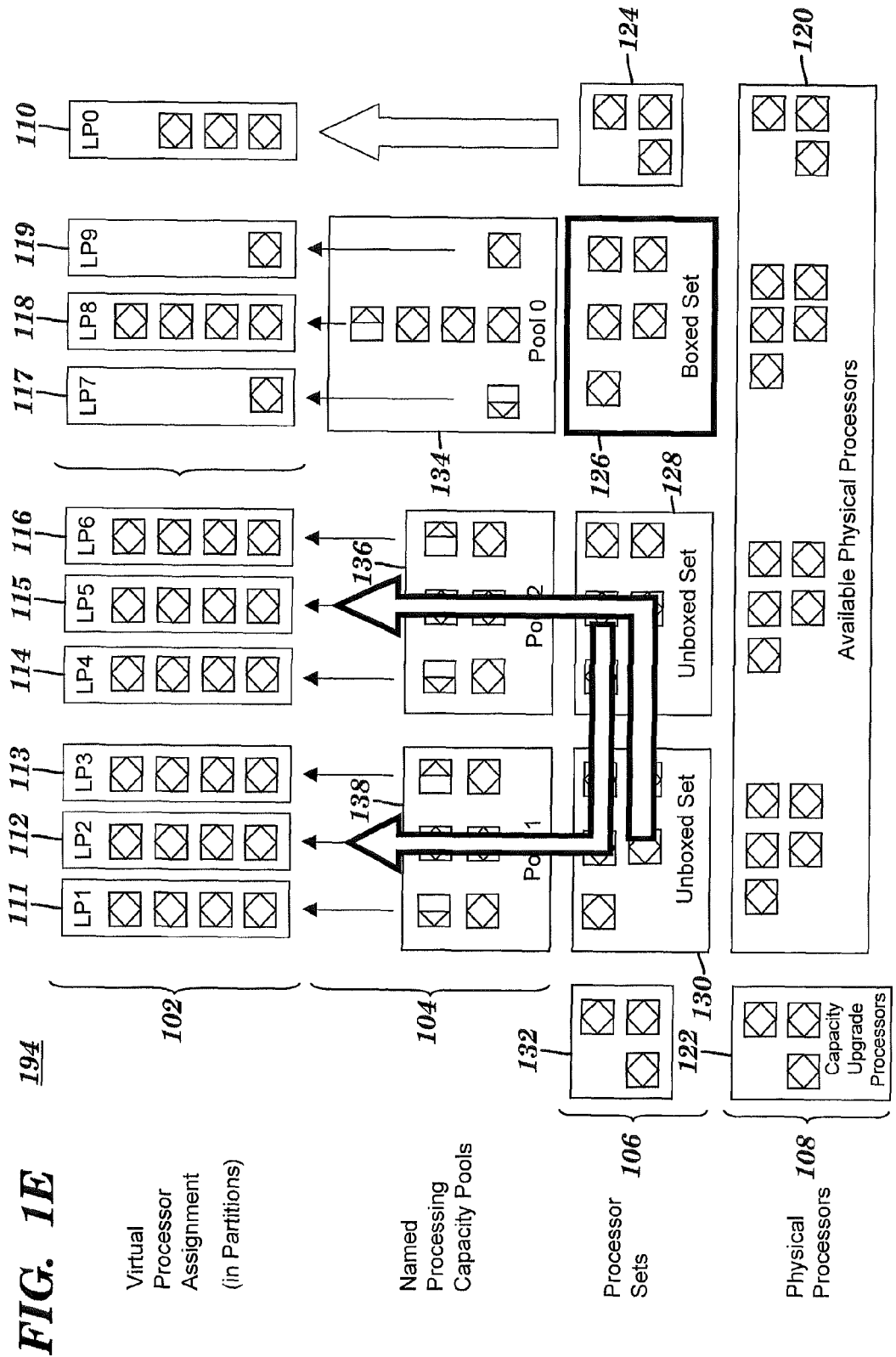
FIG. 1E is an example of the system of FIG. 1B in which spare processing capacity in unboxed processor sets is shared, in accordance with embodiments of the present invention.

FIG. 1E is an example 194 of the system of FIG. 1B in which spare processing capacity in unboxed processor sets is shared, in accordance with embodiments of the present invention. The exemplary system 194 includes the same configuration of components in FIG. 1B, but specifically defines pools 136 and 138 as including processing capacity allocated to uncapped partitions. Each of two unboxed processor sets 128 and 130 include five physical processors, with associated ownership assigned in pools 136 and 138, respectively. Logical partitions assigned to a pool to which an unboxed set is assigned have the capability to share the unused processing resources in the unboxed set with logical partitions assigned to another pool (i.e., another pool to which another unboxed set is assigned). For example, since processor sets 128 and 130 are unboxed sets, the logical partitions assigned to pool 136 are designated as being able to share their unused processing resources located in unboxed set 128 with one or more logical partitions assigned to pool 138. Similarly, the logical partitions assigned to pool 138 are designated as being able to share their unused processing resources located in unboxed set 130 with one or more logical partitions assigned to pool 136.

As a further difference between exemplary system 194 and the system of FIG. 1B, a first arrow is added that starts in unboxed set 128 and points to the logical partitions assigned to pool 138 and a second arrow is added that starts in unboxed set 130 and points to the logical partitions assigned to pool 136. These arrows added to FIG. 1E illustrate that processing capacity is shared among logical partitions assigned to different processing pools. For example, the first arrow added in FIG. 1E illustrates that processing capacity in unboxed set 128 and initially associated with pool 136 is shared among logical partitions LP1, LP2 and LP3, which are assigned to pool 138 (i.e., a pool different from pool 136). As another example, the second arrow added to FIG. 1E illustrates that processing capacity in unboxed set 130 and initially associated with pool 138 is shared among logical partitions LP4, LP5 and LP6, which are assigned to pool 136 (i.e., a pool different from pool 138).

At runtime, when the hypervisor determines that a logical partition is in need of additional processing capacity, the hypervisor first examines the named pool associated with the logical partition's primary processor set to determine if that pool has enough unused processing capacity to satisfy the logical partition's needed capacity. If the primary processor set's pool has inadequate unused processing capacity to share with the logical partition, then the hypervisor examines one or more alternate pools associated with the logical partition's one or more alternate processor sets to determine if one of the alternate pools has enough unused processing capacity to satisfy the logical partition's needed capacity. The sharing indicated by either of the two additional arrows in FIG. 1E occurs at runtime in response to the hypervisor determining that the primary processor set's pool has inadequate unused processing capacity to meet the needs of a logical partition, but an alternate processor set's pool has adequate unused processing capacity to satisfy the logical partition's needs for additional capacity. The defining of primary and alternate processing sets is discussed below relative to FIG. 2B.

As an example of runtime sharing of processing capacity between an unboxed processor set 128 and logical partition LP2, consider the arrow in system 194 that originates in unboxed set 128. In this example, a prior configuration of processing sets designated unboxed set 130 as the primary processing set associated with LP2, and unboxed set 128 as the alternate processing set associated with LP2. After determining that logical partition LP2 needs additional capacity and after determining the amount of the needed capacity, the hypervisor determines whether LP2 is capped or uncapped. If LP2 is capped, then LP2 cannot use capacity in addition to its original allocation and sharing of capacity from another unboxed set is not permitted. If LP2 is uncapped, then the hypervisor determines whether the unused capacity of LP2's primary processor set (i.e., unboxed set 130) is greater than or equal to the additional capacity needed by LP2. If the unused capacity of primary processor set 130 is greater than or equal to the additional capacity needed, then processing capacity within primary processor set 130 is shared with LP2; otherwise the hypervisor determines whether LP2's primary processor set is unboxed. If LP2's primary processor set is unboxed, then the hypervisor determines whether the needed additional processing capacity is available in LP2's alternate processing set 128. If unboxed set 128 has the needed processing capacity available, then unboxed set 128 shares the needed capacity with LP2 and the runtime sharing process ends.

The aforementioned arrows added to system 194 are shown starting in the processor sets because the processor set level is where the constraint exists for capping and because the sharing logically happens between the pools and between the processor sets. Although not shown, similar arrows could be added to other levels of system 194. For example, as the sharing of FIG. 1E appears to happen between logical partitions, an arrow analogous to the first aforementioned arrow could be shown as starting at LP4, LP5 or LP6 and ending at LP1, LP2 or LP3.

Boxed set 126 does not have the flexible sharing capabilities discussed above relative to unboxed sets 128 and 130. Instead, processing resources of boxed set 126 are not shared outside of the pool assigned to boxed set 126 (i.e., not shared outside of pool 134). That is, the processing resources of boxed set 126 are shared only among the logical partitions assigned to pool 134 (i.e., LP7-LP9). In other words, LP7-LP9 share the processing resources of boxed set 126 with no other logical partitions and no other logical partitions (i.e., other than LP7-LP9) share their processing resources with LP7-LP9.

Sharing Spare Processing Capacity from Capacity Upgrade Processors

Figure 1F:
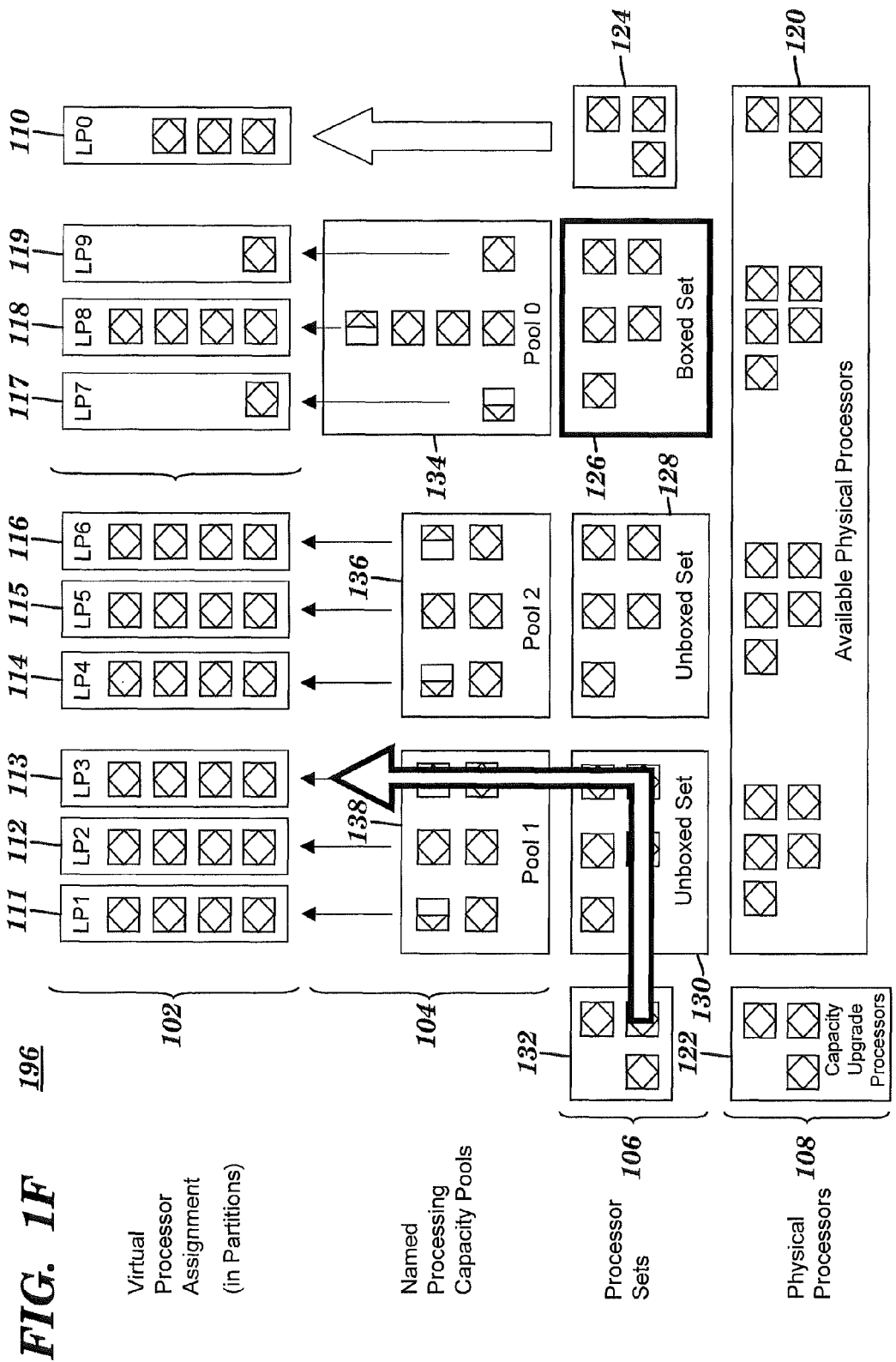
FIG. 1F is an example of the system of FIG. 1B in which spare processing capacity from capacity upgrade processors is shared, in accordance with embodiments of the present invention.

FIG. 1F is an example 196 of the system of FIG. 1B in which processing capacity from capacity upgrade processors is shared, in accordance with embodiments of the present invention. The exemplary system 196 includes the components of FIG. 1B, but is configured to allow, under certain circumstances, the sharing of processing capacity of the capacity upgrade processor set 132 with participating logical partitions (e.g., LP1-LP6), thereby treating processor set 132 in a manner similar to an unboxed set. In one embodiment, system 196 is configured to provide fractions of the capacity of each of the processors in capacity upgrade processor set 132 without requiring the full activation of the processors in processor set 132. In another embodiment (not shown), system 100 of FIG. 1B is configured to prevent an access by logical partitions of any of the processing resources of the processing capacity upgrade processor set 132.

The aforementioned circumstances under which the sharing of processing capacity of capacity upgrade processor set 132 is allowed include:

If license keys are available. In one embodiment, a license key (e.g., encrypted key file) is required to be available in order to activate one or more capacity upgrade processors. This license key approach allows a hardware vendor to prevent the capacity upgrade processors from being used without incurring a financial charge. For example, a server owner purchases a computing system with capacity upgrade processors installed, but does not complete the financial transaction to receive the license keys. In this example, the capacity upgrade processors of the server cannot be shared unless the aforementioned financial transaction is completed.

If a first load threshold has not been met. In a novel aspect of the present invention, the hardware vendor allows the user to occasionally access the capacity upgrade processors for a small number of processing cycles, up to a predetermined first load threshold. The first load threshold is, for example, a percentage of the total processor capacity available in the entire capacity upgrade processor set (e.g., 10% of 4 processors in the set).

If a second load threshold has not been met. In a novel aspect of the present invention, the hardware vendor allows the user to occasionally access the capacity upgrade processors for a small number of processing cycles, up to a predetermined second load threshold. The second load threshold is, for instance, a percentage of a single chip processor capacity. For example, if a user requests 80% of one full capacity upgrade processor, the second load threshold has been met and the user has to fully activate, via a purchase, an additional processor chip (i.e., the user no longer has access to processing cycles of the capacity upgrade processors).

If all thresholds have not been met. In a novel aspect of the present invention, the hardware vendor allows the user to occasionally access the capacity upgrade processors for a small number of processing cycles, up to a mix of thresholds over a period of time. In one embodiment, there are a mix of minimum and maximum thresholds, where the system is allowed to use up to a minimum load threshold over a predetermined first period of time (e.g., average up to 5% load during a 24-hour period), as long as a maximum load threshold over a predetermined second period of time is not reached (e.g., average up to 15% load over a 2-hour period). In one embodiment, a penalty restricting shared use of the capacity upgrade processors is imposed if any of the thresholds are reached. The penalty is in the form of: if a threshold is reached, the user is not permitted to use more than X load over the next time period of T. For example, if the aforementioned 24-hour threshold is reached, the user is not permitted to use more than 2% load of the capacity upgrade processors over the next 48 hour period. As another example, if the aforementioned 2-hour threshold is reached, the user is not allowed more than 0% load of the capacity upgrade processors over the next 4 hours.

As a further difference between exemplary system 196 and the system of FIG. 1B, an arrow is added that starts in processor set 132, which includes the capacity upgrade processors 122. This particular arrow indicates that processing capacity from capacity upgrade processor set 132 is provided to logical partition LP3.

Configuring Processor Sets, Named Pools and Logical Partitions

Figure 2A:
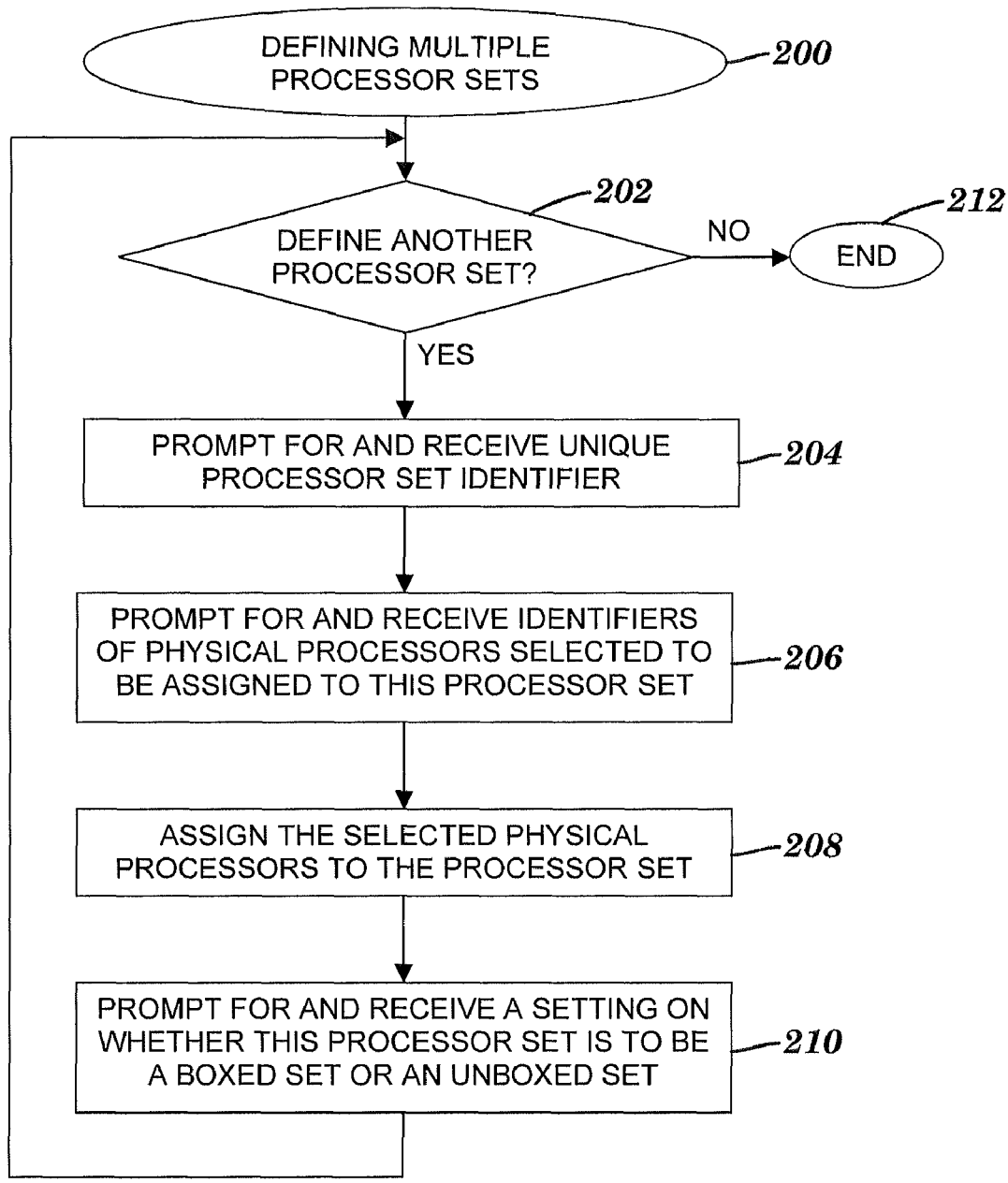
FIG. 2A is a flow chart of a process of defining multiple processor sets in the systems of FIGS. 1B and 1C, in accordance with embodiments of the present invention.

FIG. 2A is a flow chart of a process of defining multiple processor sets in the systems of FIGS. 1B and 1C, in accordance with embodiments of the present invention. In one embodiment, the steps of the process of FIG. 2A are performed by the HMC, which is discussed below relative to FIG. 4. The process of defining multiple processor sets begins at step 200. If inquiry step 202 determines that a first or another processor set needs to be defined, then step 204 prompts for and receives a unique processor set identifier. Physical processors are selected to be assigned to the processor set identified in step 204. Step 206 prompts for and receives identifiers of the selected physical processors. In step 208, the selected physical processors are assigned to the processor set identified in step 204. Step 210 prompts for and receives a setting that determines whether the identified processor set is a boxed set or an unboxed set. Following step 210, the process of FIG. 2A returns to inquiry step 202. If inquiry step 202 determines that another process set does not need to be defined, then the process of FIG. 2A ends at step 212.

Figure 2B:
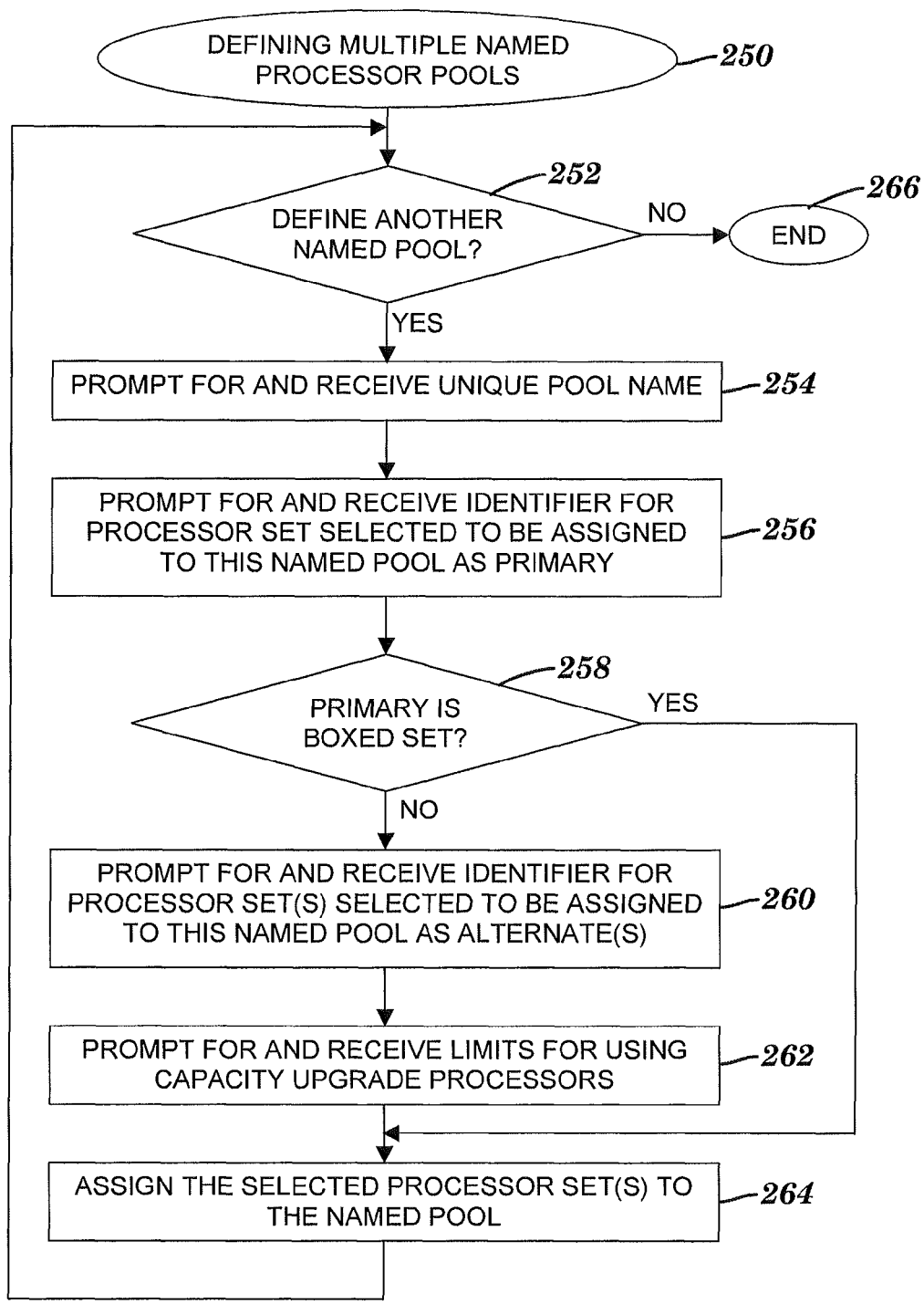
FIG. 2B is a flow chart of a process of defining multiple named processor pools in the systems of FIGS. 1B and 1C, in accordance with embodiments of the present invention.

FIG. 2B is a flow chart of a process of defining multiple named processor pools in the systems of FIGS. 1B and 1C, in accordance with embodiments of the present invention. In one embodiment, the steps of the process of FIG. 2B are performed by the HMC, which is discussed below relative to FIG. 4. The process of defining multiple named processor pools begins at step 250. If inquiry step 252 determines that a first or another named pool needs to be defined, then step 254 prompts for and receives a unique pool name. Step 256 prompts for and receives an identifier for the processor set selected to be assigned to the named pool as a primary processor set. If inquiry step 258 determines that the primary processor set is not a boxed set, then step 260 prompts for and receives one or more identifiers for one or more processor sets selected to be assigned to the named pool as one or more alternate processor sets. Step 262 prompts for and receives limits for using capacity upgrade processors. In step 264, the selected processor set(s) from steps 256 and 260 are assigned to the named pool that was named in step 254.

Returning to step 258, if the primary processor set is determined to be a boxed set, then step 264 assigns the primary processor set identified in step 256 to the named pool (i.e., the pool named in step 254), and in this case there are no alternate processor pools to be assigned.

Returning to step 252, if no other named pool needs to be defined, then the process of FIG. 2B ends at step 266.

Figure 3:
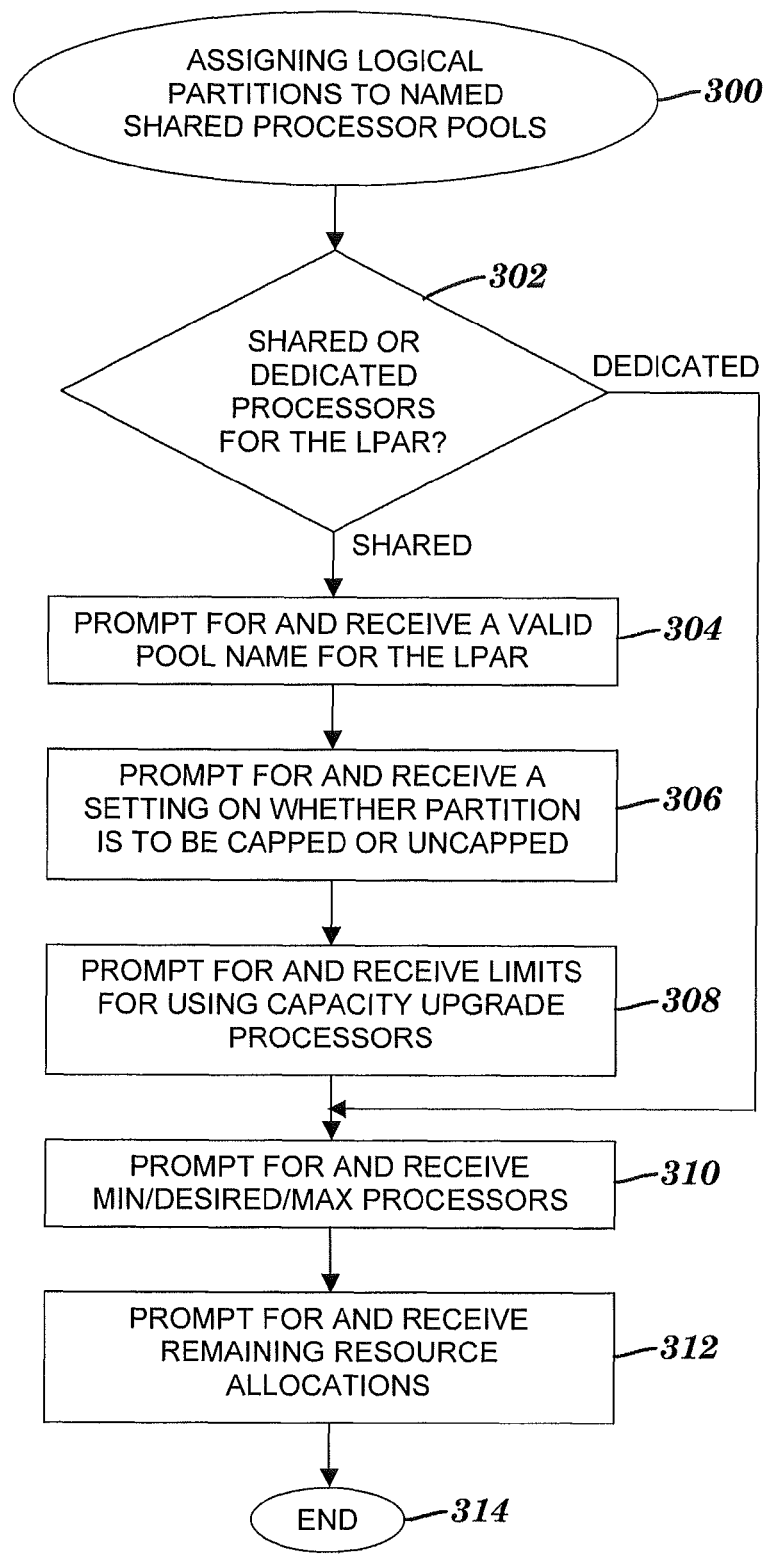
FIG. 3 is a flow chart of a process of assigning logical partitions to named shared processor pools in the systems of FIGS. 1B and 1C, in accordance with embodiments of the present invention.

FIG. 3 is a flow chart of a process of assigning logical partitions to named shared processor pools in the system of FIG. 1C, in accordance with embodiments of the present invention. In one embodiment, the steps of the process of FIG.

3 are performed by the HMC, which is discussed below relative to FIG. 4. The process of assigning logical partitions (a.k.a. LPARs) to named shared processor pools begins at step 300. If inquiry step 302 determines that shared (i.e., not dedicated) processors are to be associated with an LPAR, then step 304 prompts for and receives a valid pool name of a pool to which the LPAR is assigned. Step 306 prompts for and receives a setting that determines whether the LPAR is to be capped or uncapped. Step 308 prompts for and receives limits for using capacity upgrade processors. Step 310 prompts for and receives a minimum number, a desired number, and a maximum number of processing capacity to be associated with the LPAR. If the processing resources fail to meet the specified minimum number, then the activation of a logical partition fails. If the available processing resources satisfy the minimum number but do not satisfy the desired number, then the activated logical partition is provided as many of the processing resources as are available. The maximum number is used to limit the maximum processing resources when dynamic logical partitioning operations are performed on the logical partition. The desired number is the amount of processing resources that are obtained by a logical partition if the processing capacity is not overcommitted. The minimum and maximum numbers establish a range within which processing resources can be moved dynamically. Step 312 prompts for and receives the remaining resource (e.g., memory and adapter card) allocations. The process of FIG. 3 ends at step 314.

Returning to step 302, if it is determined that dedicated (i.e., not shared) processors are being associated with the LPAR, then the process of FIG. 3 continues with step 310, as described above, except the minimum, desired and maximum numbers apply to processors only.

Computing System

Figure 4:
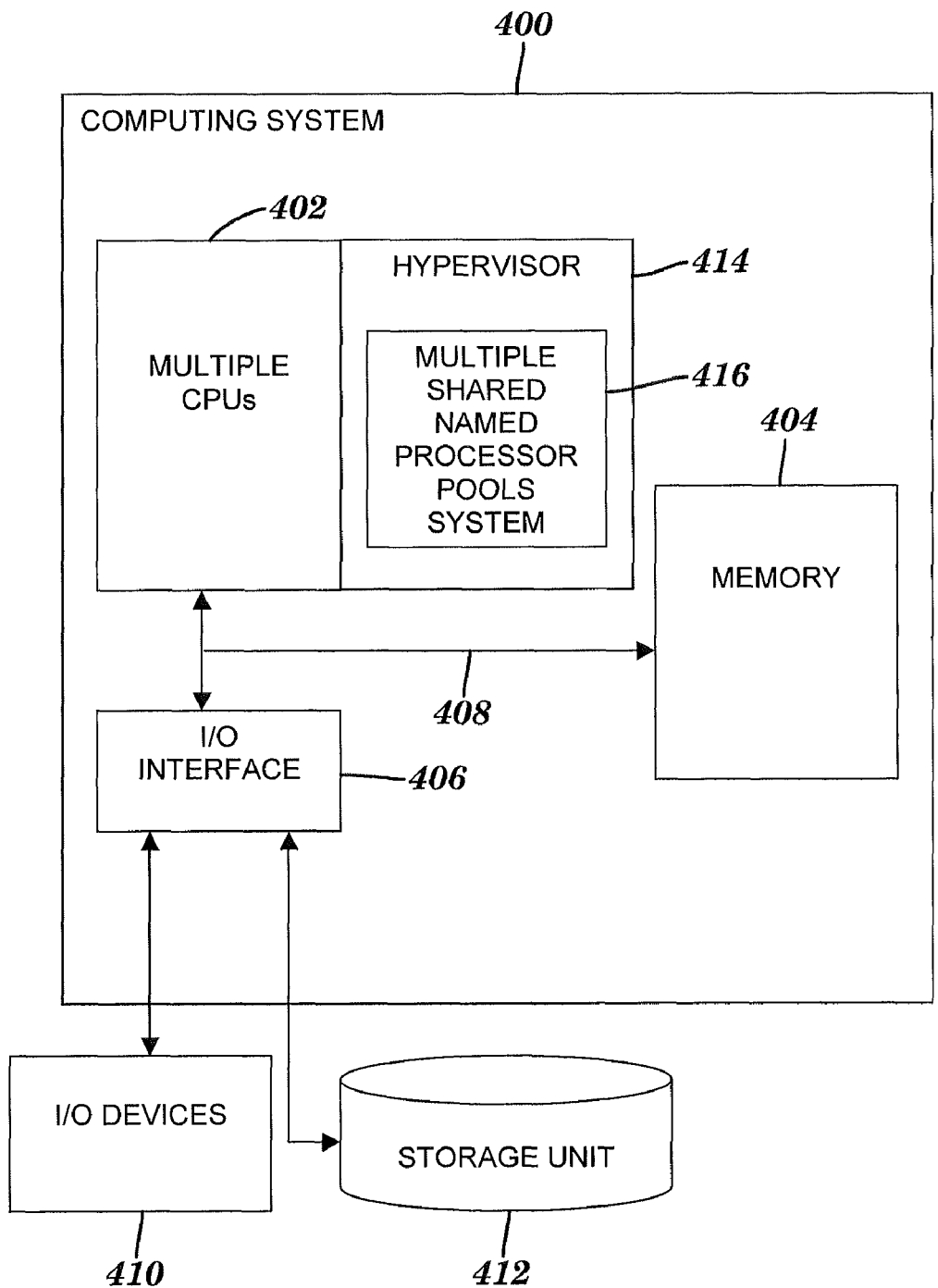
FIG. 4 is a computing system that implements the processes of FIG. 2A-2B and FIG. 3, in accordance with embodiments of the present invention.

FIG. 4 is a computing system that implements the processes of FIG. 2A-2B and FIG. 3, in accordance with embodiments of the present invention. Computing system 400 generally comprises multiple central processing units (CPUs; a.k.a. processors) 402, a memory 404, an input/output (I/O) interface 406, a bus 408, I/O devices 410 and a storage unit 412.

System 400 also includes a hypervisor 414 or other firmware-based partition manager that manages logical partitioning of processor resources by presenting a partitioned view of hardware to task dispatchers (not shown). The hypervisor is super-privileged code that dispatches virtual processors to physical processors for execution of tasks and is capable of accessing resources, and specifically processor resources, in any partition. The hypervisor causes state values to be written to various hardware registers (not shown) and other structures, which define the boundaries and behavior of the logical partitions. Hypervisor 414 provides the runtime multiple named pool sharing functionality described above relative to FIGS. 1B-1F. Hypervisor 414 also includes shared processor pool configuration logic (e.g., in a hardware management console (HMC) (not shown)) that configures multiple named shared processor pools in system 416 and implements the steps in the processes of FIGS. 2A-2B and FIG. 3.

CPUs 402 are a plurality of processing units that perform computation and control functions of computing system 400 and may be distributed across one or more locations (e.g., on two separate servers or on a client and a server).

Memory 404 may comprise any known type of data storage media, including bulk storage, magnetic media, optical media, random access memory (RAM), read-only memory (ROM), a data cache, a data object, etc. Cache memory elements of memory 404 provide temporary storage of at least some program code in order to reduce the number of times code must be retrieved from bulk storage during execution. Moreover, similar to CPUs 402, memory 404 may reside at a single physical location, comprising one or more types of data storage, or be distributed across a plurality of physical systems in various forms. Further, memory 404 can include data distributed across, for example, a LAN, WAN or storage area network (SAN) (not shown). Still further, memory 404 may include other systems not shown in FIG. 4, such as an operating system (e.g., Linux) that runs on one or more processing units of CPUs 402 and provides control of various components within and/or connected to computing system 400.

I/O interface 406 comprises any system for exchanging information to or from an external source. I/O devices 410 comprise any known type of external device, including a display monitor, keyboard, mouse, printer, speakers, handheld device, printer, facsimile, etc. Bus 408 provides a communication link between each of the components in computing system 400, and may comprise any type of transmission link, including electrical, optical, wireless, etc.

I/O interface 406 also allows computing system 400 to store and retrieve information (e.g., program instructions or data) from an auxiliary storage device 412. The auxiliary storage device may be a non-volatile storage device such as a magnetic disk drive or an optical disk drive (e.g., a CD-ROM drive which receives a CD-ROM disk). Computing system 400 can store and retrieve information from other auxiliary storage devices (not shown), which can include a direct access storage device (DASD) (e.g., hard disk or floppy diskette), a magneto-optical disk drive, a tape drive, or a wireless communication device.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of multiple named shared processor pools system 416 for use by or in connection with a computing system 400 or any instruction execution system to provide and facilitate the capabilities of the present invention. For the purposes of this description, a computer-usable or computer-readable medium can be any apparatus that can store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, RAM, ROM, a rigid magnetic disk and an optical disk. Current examples of optical disks include compact disk—read-only memory (CD-ROM), compact disk—read/write (CD-R/W) and DVD.

Any of the components of the present invention can be deployed, managed, serviced, etc. by a service provider that offers to deploy or integrate computing infrastructure with respect to the process of assigning logical partitions to multiple named shared processor pools of the present invention. Thus, the present invention discloses a process for supporting computer infrastructure, comprising integrating, hosting, maintaining and deploying computer-readable code into a computing system 400, wherein the code in combination with the computing system is capable of performing a method of assigning logical partitions to multiple named shared processor pools.

In another embodiment, the invention provides a business method that performs the process steps of the invention on a subscription, advertising and/or fee basis. That is, a service provider, such as a Solution Integrator, can offer to create, maintain, support, etc. a process of assigning logical partitions to multiple named shared processor pools of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-based method of assigning logical partitions of a computing system to multiple named processor pools, said method comprising:

said computing system assigning a plurality of sets of one or more physical processors from a plurality of available physical processors in said computing system to a plurality of predefined processor sets so that said sets of one or more physical processors are associated with said processor sets in a one-to-one correspondence;

said computing system defining a plurality of named processor pools, each named processor pool being associated with a unique pool name;

said computing system assigning said plurality of processor sets to said plurality of named processor pools so that each processor set is assigned to a unique named processor pool of said plurality of named processor pools;

said computing system assigning a first set of logical partitions to a first named processor pool of said plurality of named processor pools, wherein a first processor set of said plurality of processor sets is assigned to said first named processor pool based on said assigned plurality of processor sets, and wherein a first set of said plurality of sets of one or more physical processors is assigned to said first processor set based on said assigned plurality of sets of one or more physical processors;

said computing system assigning a second set of logical partitions to a second named processor pool of said plurality of named processor pools, wherein a second processor set of said plurality of processor sets is assigned to said second named processor pool based on said assigned plurality of processor sets, and wherein a second set of said plurality of sets of one or more physical processors is assigned to said second processor set based on said assigned plurality of sets of one or more physical processors;

said computing system assigning a processing resource of said first processor set to a first partition included in said first set of logical partitions;

said computing system assigning said first partition to said first named processor pool;

said computing system designating a second partition included in said second set of logical partitions as an uncapped partition;

said computing system assigning said second partition to said second named processor pool; and said computing system executing a task in said second partition included in said second set of logical partitions and assigned to said second named processor pool by said second partition executing said task on said processing resource assigned to said first partition that is assigned to said first named processor pool, wherein said executing said task includes sharing said processing resource assigned to said first partition with said second partition.

2. The method of claim 1, further comprising:

said computing system defining said second processor set as a primary processor set for said second partition included in said second set of logical partitions that is assigned to said second named processor pool;

said computing system defining said first processor set as an alternate processor set for said second partition included in said second set of logical partitions that is assigned to said second named processor pool;

at runtime said computing system determining said second partition requires additional processing capacity;

based on said second processor set being defined as said primary processor set, said computing system determining said second named processor pool has inadequate unused processing capacity to satisfy said required additional processing capacity; and based on said first processor set being defined as said alternate processor set, said computing system determining said first named processor pool has adequate unused processing capacity to satisfy said required additional processing capacity, wherein said sharing said processing resource assigned to said first partition with said second partition is based on said first named processor pool having adequate unused processing capacity to satisfy said required additional processing capacity.

3. The method of claim 1, further comprising:

said computing system defining said first processor set as an unboxed processor set, wherein said defining said first processor set includes providing a capability of sharing processing resources of said unboxed processor set; and said computing system defining said second processor set as a boxed processor set, wherein said defining said second processor set includes preventing a sharing of processing resources of said boxed processor set with said first set of logical partitions and preventing a utilization by said second set of logical partitions of processing resources being shared by said unboxed processor set.

4. The method of claim 1, further comprising:

said computing system assigning one or more capacity upgrade processors to a capacity upgrade processor set, said one or more capacity upgrade processors being installed but not activated in said computing system;

configuring said computing system to permit a sharing of a first set of processing resources provided by said capacity upgrade processor set with a logical partition of said first set of logical partitions;

said computing system defining said first processor set as an unboxed processor set, wherein said defining said first processor set includes providing a capability of utilizing said first set of processing resources provided by said capacity upgrade processor set and a second set of processing resources provided by any unboxed processor set of said computing system; and sharing said first set of processing resources with said logical partition of said first set of logical partitions.

5. The method of claim 4, wherein said sharing said first set of processing resources includes allowing an access of said capacity upgrade processor set for a predetermined number of processing cycles in regular predetermined time intervals and not reaching a threshold T, wherein T is selected from the group consisting of:

a first load threshold based on a percentage of total processing capacity available in all capacity upgrade processors of said capacity upgrade processor set, a second load threshold based on a percentage of processing capacity provided by a single capacity upgrade processor of said capacity upgrade processor set, and a combination minimum/maximum threshold that is reached upon reaching a minimum threshold or upon reaching a maximum threshold, said minimum threshold based on a first average percentage of processing capacity provided by said capacity upgrade processor set in regular intervals of a first duration and said maximum threshold based on a second average percentage of processing capacity provided by said capacity upgrade processor set in regular intervals of a second duration.

6. A computing system comprising a processor coupled to a computer-readable memory unit and a hypervisor, said hypervisor comprising a software application and instructions that when executed by the processor implement a method of assigning logical partitions of said computing system to multiple named processor pools, said method comprising:

said computing system assigning a plurality of sets of one or more physical processors from a plurality of available physical processors in said computing system to a plurality of predefined processor sets so that said sets of one or more physical processors are associated with said processor sets in a one-to-one correspondence;

said computing system defining a plurality of named processor pools, each named processor pool being associated with a unique pool name;

said computing system assigning said plurality of processor sets to said plurality of named processor pools so that each processor set is assigned to a unique named processor pool of said plurality of named processor pools;

said computing system assigning a first set of logical partitions to a first named processor pool of said plurality of named processor pools, wherein a first processor set of said plurality of processor sets is assigned to said first named processor pool based on said assigned plurality of processor sets, and wherein a first set of said plurality of sets of one or more physical processors is assigned to said first processor set based on said assigned plurality of sets of one or more physical processors; and said computing system assigning a second set of logical partitions to a second named processor pool of said plurality of named processor pools, wherein a second processor set of said plurality of processor sets is assigned to said second named processor pool based on said assigned plurality of processor sets, and wherein a second set of said plurality of sets of one or more physical processors is assigned to said second processor set based on said assigned plurality of sets of one or more physical processors, said computing system assigning a processing resource of said first processor set to a first partition included in said first set of logical partitions;

said computing system assigning said first partition to said first named processor pool;

said computing system designating a second partition included in said second set of logical partitions as an uncapped partition;

said computing system assigning said second partition to said second named processor pool; and said computing system executing a task in said second partition included in said second set of logical partitions and assigned to said second named processor pool by said second partition executing said task on said processing resource assigned to said first partition that is assigned to said first named processor pool, wherein said executing said task includes sharing said processing resource assigned to said first partition with said second partition.

7. The computing system of claim 6, wherein said method further comprises:

said computing system defining said second processor set as a primary processor set for said second partition included in said second set of logical partitions that is assigned to said second named processor pool; and said computing system defining said first processor set as an alternate processor set for said second partition included in said second set of logical partitions that is assigned to said second named processor pool;

at runtime said computing system determining said second partition requires additional processing capacity;

based on said second processor set being defined as said primary processor set, said computing system determining said second named processor pool has inadequate unused processing capacity to satisfy said required additional processing capacity; and based on said first processor set being defined as said alternate processor set, said computing system determining said first named processor pool has adequate unused processing capacity to satisfy said required additional processing capacity, wherein said sharing said processing resource assigned to said first partition with said second partition is based on said first named processor pool having adequate unused processing capacity to satisfy said required additional processing capacity.

8. The computing system of claim 6, wherein said method further comprises:

said computing system defining said first processor set as an unboxed processor set, wherein said defining said first processor set includes providing a capability of sharing processing resources of said unboxed processor set; and said computing system defining said second processor set as a boxed processor set, wherein said defining said second processor set includes preventing a sharing of processing resources of said boxed processor set with said first set of logical partitions and preventing a utilization by said second set of logical partitions of processing resources being shared by said unboxed processor set.

9. The computing system of claim 6, wherein said method further comprises:

said computing system assigning one or more capacity upgrade processors to a capacity upgrade processor set, said one or more capacity upgrade processors being installed but not activated in said computing system;

configuring said computing system to permit a sharing of a first set of processing resources provided by said capacity upgrade processor set with a logical partition of said first set of logical partitions;

said computing system defining said first processor set as an unboxed processor set, wherein said defining said first processor set includes providing a capability of utilizing said first set of processing resources provided by said capacity upgrade processor set and a second set of processing resources provided by any unboxed processor set of said computing system; and sharing said first set of processing resources with said logical partition of said first set of logical partitions.

10. The computing system of claim 9, wherein said sharing said first set of processing resources includes allowing an access of said capacity upgrade processor set for a predetermined number of processing cycles in regular predetermined time intervals and not reaching a threshold T, wherein T is selected from the group consisting of:

a first load threshold based on a percentage of total processing capacity available in all capacity upgrade processors of said capacity upgrade processor set, a second load threshold based on a percentage of processing capacity provided by a single capacity upgrade processor of said capacity upgrade processor set, and a combination minimum/maximum threshold that is reached upon reaching a minimum threshold or upon reaching a maximum threshold, said minimum threshold based on a first average percentage of processing capacity provided by said capacity upgrade processor set in regular intervals of a first duration and said maximum threshold based on a second average percentage of processing capacity provided by said capacity upgrade processor set in regular intervals of a second duration.

11. A computer program product comprising a tangible, computer-readable storage device having a computer-readable program code stored therein, said computer-readable program code containing instructions that when carried out by a processor of a computer system implement a method of assigning logical partitions of said computer system to multiple named processor pools, said method comprising:

said computer system assigning a plurality of sets of one or more physical processors from a plurality of available physical processors in said computer system to a plurality of predefined processor sets so that said sets of one or more physical processors are associated with said processor sets in a one-to-one correspondence;

said computer system defining a plurality of named processor pools, each named processor pool being associated with a unique pool name;

said computer system assigning said plurality of processor sets to said plurality of named processor pools so that each processor set is assigned to a unique named processor pool of said plurality of named processor pools;

said computer system assigning a first set of logical partitions to a first named processor pool of said plurality of named processor pools, wherein a first processor set of said plurality of processor sets is assigned to said first named processor pool based on said assigned plurality of processor sets, and wherein a first set of said plurality of sets of one or more physical processors is assigned to said first processor set based on said assigned plurality of sets of one or more physical processors; and said computer system assigning a second set of logical partitions to a second named processor pool of said plurality of named processor pools, wherein a second processor set of said plurality of processor sets is assigned to said second named processor pool based on said assigned plurality of processor sets, and wherein a second set of said plurality of sets of one or more physical processors is assigned to said second processor set based on said assigned plurality of sets of one or more physical processors, said computer system assigning a processing resource of said first processor set to a first partition included in said first set of logical partitions;

said computer system assigning said first partition to said first named processor pool;

said computer system designating a second partition included in said second set of logical partitions as an uncapped partition;

said computer system assigning said second partition to said second named processor pool; and said computer system executing a task in said second partition included in said second set of logical partitions and assigned to said second named processor pool by said second partition executing said task on said processing resource assigned to said first partition that is assigned to said first named processor pool, wherein said executing said task includes sharing said processing resource assigned to said first partition with said second partition.

12. The program product of claim 11, wherein said defining said plurality of named processor pools comprises:

said computer system defining said second processor set as a primary processor set for said second partition included in said second set of logical partitions that is assigned to said second named processor pool;

said computer system defining said first processor set as an alternate processor set for said second partition included in said second set of logical partitions that is assigned to said second named processor pool;

at runtime said computer system determining said second partition requires additional processing capacity;

based on said second processor set being defined as said primary processor set, said computer system determining said second named processor pool has inadequate unused processing capacity to satisfy said required additional processing capacity; and based on said first processor set being defined as said alternate processor set, said computer system determining said first named processor pool has adequate unused processing capacity to satisfy said required additional processing capacity, wherein said sharing said processing resource assigned to said first partition with said second partition is based on said first named processor pool having adequate unused processing capacity to satisfy said required additional processing capacity.

13. The program product of claim 11, wherein said method further comprises:

said computer system defining said first processor set as an unboxed processor set, wherein said defining said first processor set includes providing a capability of sharing processing resources of said unboxed processor set; and said computer system defining said second processor set as a boxed processor set, wherein said defining said second processor set includes preventing a sharing of processing resources of said boxed processor set with said first set of logical partitions and preventing a utilization by said second set of logical partitions of processing resources being shared by said unboxed processor set.

14. The program product of claim 11, wherein said method further comprises:

said computer system assigning one or more capacity upgrade processors to a capacity upgrade processor set, said one or more capacity upgrade processors being installed but not activated in said computer system;

configuring said computer system to permit a sharing of a first set of processing resources provided by said capacity upgrade processor set with a logical partition of said first set of logical partitions;

said computer system defining said first processor set as an unboxed processor set, wherein said defining said first processor set includes providing a capability of utilizing said first set of processing resources provided by said capacity upgrade processor set and a second set of processing resources provided by any unboxed processor set of said computer system; and sharing said first set of processing resources with said logical partition of said first set of logical partitions.

15. The program product of claim 14, wherein said sharing said first set of processing resources includes allowing an access of said capacity upgrade processor set for a predetermined number of processing cycles in regular predetermined time intervals and not reaching a threshold T, wherein T is selected from the group consisting of:

a first load threshold based on a percentage of total processing capacity available in all capacity upgrade processors of said capacity upgrade processor set, a second load threshold based on a percentage of processing capacity provided by a single capacity upgrade processor of said capacity upgrade processor set, and a combination minimum/maximum threshold that is reached upon reaching a minimum threshold or upon reaching a maximum threshold, said minimum threshold based on a first average percentage of processing capacity provided by said capacity upgrade processor set in regular intervals of a first duration and said maximum threshold based on a second average percentage of processing capacity provided by said capacity upgrade processor set in regular intervals of a second duration.

16. A process for supporting computing infrastructure, said process comprising providing at least one support service for at least one of creating, integrating, hosting, maintaining, and deploying computer-readable code in a computing system comprising a processor, wherein said processor carries out instructions contained in the code causing said computing system to perform a method of assigning logical partitions of a computing system to multiple named processor pools, said method comprising:

said computing system assigning a plurality of sets of one or more physical processors from a plurality of available physical processors in said computing system to a plurality of predefined processor sets so that said sets of one or more physical processors are associated with said processor sets in a one-to-one correspondence;

said computing system defining a plurality of named processor pools, each named processor pool being associated with a unique pool name;

said computing system assigning said plurality of processor sets to said plurality of named processor pools so that each processor set is assigned to a unique named processor pool of said plurality of named processor pools;

said computing system assigning a first set of logical partitions to a first named processor pool of said plurality of named processor pools, wherein a first processor set of said plurality of processor sets is assigned to said first named processor pool based on said assigned plurality of processor sets, and wherein a first set of said plurality of sets of one or more physical processors is assigned to said first processor set based on said assigned plurality of sets of one or more physical processors; and said computing system assigning a second set of logical partitions to a second named processor pool of said plurality of named processor pools, wherein a second processor set of said plurality of processor sets is assigned to said second named processor pool based on said assigned plurality of processor sets, and wherein a second set of said plurality of sets of one or more physical processors is assigned to said second processor set based on said assigned plurality of sets of one or more physical processors, said computing system assigning a processing resource of said first processor set to a first partition included in said first set of logical partitions;

said computing system assigning said first partition to said first named processor pool;

said computing system designating a second partition included in said second set of logical partitions as an uncapped partition;

said computing system assigning said second partition to said second named processor pool; and said computing system executing a task in said second partition included in said second set of logical partitions and assigned to said second named processor pool by said second partition executing said task on said processing resource assigned to said first partition that is assigned to said first named processor pool, wherein said executing said task includes sharing said processing resource assigned to said first partition with said second partition.

17. The process of claim 16, wherein said defining said plurality of named processor pools comprises:

said computing system defining said second processor set as a primary processor set for said second partition included in said second set of logical partitions that is assigned to said second named processor pool; and said computing system defining said first processor set as an alternate processor set for said second partition included in said second set of logical partitions that is assigned to said second named processor pool;

at runtime said computing system determining said second partition requires additional processing capacity;

based on said second processor set being defined as said primary processor set, said computing system determining said second named processor pool has inadequate unused processing capacity to satisfy said required additional processing capacity; and based on said first processor set being defined as said alternate processor set, said computing system determining said first named processor pool has adequate unused processing capacity to satisfy said required additional processing capacity, wherein said sharing said processing resource assigned to said first partition with said second partition is based on said first named processor pool having adequate unused processing capacity to satisfy said required additional processing capacity.

18. The process of claim 16, wherein said method further comprises:

said computing system defining said first processor set as an unboxed processor set, wherein said defining said first processor set includes providing a capability of sharing processing resources of said unboxed processor set; and said computing system defining said second processor set as a boxed processor set, wherein said defining said second processor set includes preventing a sharing of processing resources of said boxed processor set with said first set of logical partitions and preventing a utilization by said second set of logical partitions of processing resources being shared by said unboxed processor set.

19. The process of claim 16, wherein said method further comprises:

said computing system assigning one or more capacity upgrade processors to a capacity upgrade processor set, said one or more capacity upgrade processors being installed but not activated in said computing system;

configuring said computing system to permit a sharing of a first set of processing resources provided by said capacity upgrade processor set with a logical partition of said first set of logical partitions;

said computing system defining said first processor set as an unboxed processor set, wherein said defining said first processor set includes providing a capability of utilizing said first set of processing resources provided by said capacity upgrade processor set and a second set of processing resources provided by any unboxed processor set of said computing system; and sharing said first set of processing resources with said logical partition of said first set of logical partitions.

20. The process of claim 19, wherein said sharing said first set of processing resources includes allowing an access of said capacity upgrade processor set for a predetermined number of processing cycles in regular predetermined time intervals and not reaching a threshold T, wherein T is selected from the group consisting of:

a first load threshold based on a percentage of total processing capacity available in all capacity upgrade processors of said capacity upgrade processor set, a second load threshold based on a percentage of processing capacity provided by a single capacity upgrade processor of said capacity upgrade processor set, and a combination minimum/maximum threshold that is reached upon reaching a minimum threshold or upon reaching a maximum threshold, said minimum threshold based on a first average percentage of processing capacity provided by said capacity upgrade processor set in regular intervals of a first duration and said maximum threshold based on a second average percentage of processing capacity provided by said capacity upgrade processor set in regular intervals of a second duration.

* * * * *